US007726671B2

(12) United States Patent
Musi

(10) Patent No.: US 7,726,671 B2
(45) Date of Patent: Jun. 1, 2010

(54) WHEELED SHOPPING BAG

(75) Inventor: Juan Carlos Musi, Miami, FL (US)

(73) Assignee: Skyworld Business Group, Inc., Miami, FL (US)

( * ) Notice: Subject to any disclaimer, the term of this patent is extended or adjusted under 35 U.S.C. 154(b) by 324 days.

(21) Appl. No.: 11/873,614

(22) Filed: Mar. 4, 2008

(65) Prior Publication Data

US 2009/0224514 A1 Sep. 10, 2009

(51) Int. Cl.
*B62B 3/00* (2006.01)
(52) U.S. Cl. .............................. 280/47.26; 280/DIG. 3; 280/644; 280/37
(58) Field of Classification Search .................. 280/37, 280/30, 35, 47.26, 47.33, 47.19, 42, 47.24, 280/644, 652, 654, 651, DIG. 4
See application file for complete search history.

(56) References Cited

U.S. PATENT DOCUMENTS

| | | | | | |
|---|---|---|---|---|---|
| 2,610,071 | A | * | 9/1952 | Davis et al. ................. | 280/652 |
| 2,868,557 | A | * | 1/1959 | Klipp ..................... | 280/DIG. 3 |
| 3,092,395 | A | * | 6/1963 | Mitty et al. ................. | 280/652 |
| 3,135,527 | A | * | 6/1964 | Knapp ....................... | 280/654 |
| 3,197,225 | A | | 7/1965 | Powell ...................... | 280/652 |
| 5,022,574 | A | * | 6/1991 | Cesari ........................ | 224/153 |
| 5,125,675 | A | * | 6/1992 | Engelbrecht ............. | 280/47.26 |
| 5,244,219 | A | * | 9/1993 | Hadlum .................. | 280/47.26 |
| 5,464,237 | A | * | 11/1995 | Saporiti ..................... | 280/30 |
| 6,073,943 | A | * | 6/2000 | Serrault ................. | 280/47.26 |
| 6,267,393 | B1 | * | 7/2001 | Mengrone et al. ............ | 280/30 |
| 6,293,569 | B1 | * | 9/2001 | Ferre .......................... | 280/35 |
| 6,547,263 | B1 | * | 4/2003 | McGeorge et al. ........... | 280/30 |
| 6,955,365 | B2 | * | 10/2005 | Giampavolo et al. ..... | 280/47.26 |

* cited by examiner

*Primary Examiner*—Hau V Phan
(74) *Attorney, Agent, or Firm*—Sanchelima & Associates, P.A.

(57) ABSTRACT

A wheeled bag assembly having an elongated wheeled bottom assembly made out of a rigid and moldable material with an upperside, an underside, first and second lateral sides, first and second ends defined, respectively, by first and second folds along said underside, said first fold extending away from said underside a first predetermined distance. Wheel members mounted to the lateral sides opposite to a supporting fold with cooperative dimensions to permit the bottom assembly to be at rest at a substantially parallel and spaced apart relationship with respect to a supporting surface. A bag member with flat bottom wall is mounted over the upperside and extends upwardly defining an internal compartment and an upper end opening. A user tilts the bag assembly and pulls it from handles mounted adjacent to the opening causing the wheels to roll and the assembly to easily move with its contents.

19 Claims, 7 Drawing Sheets

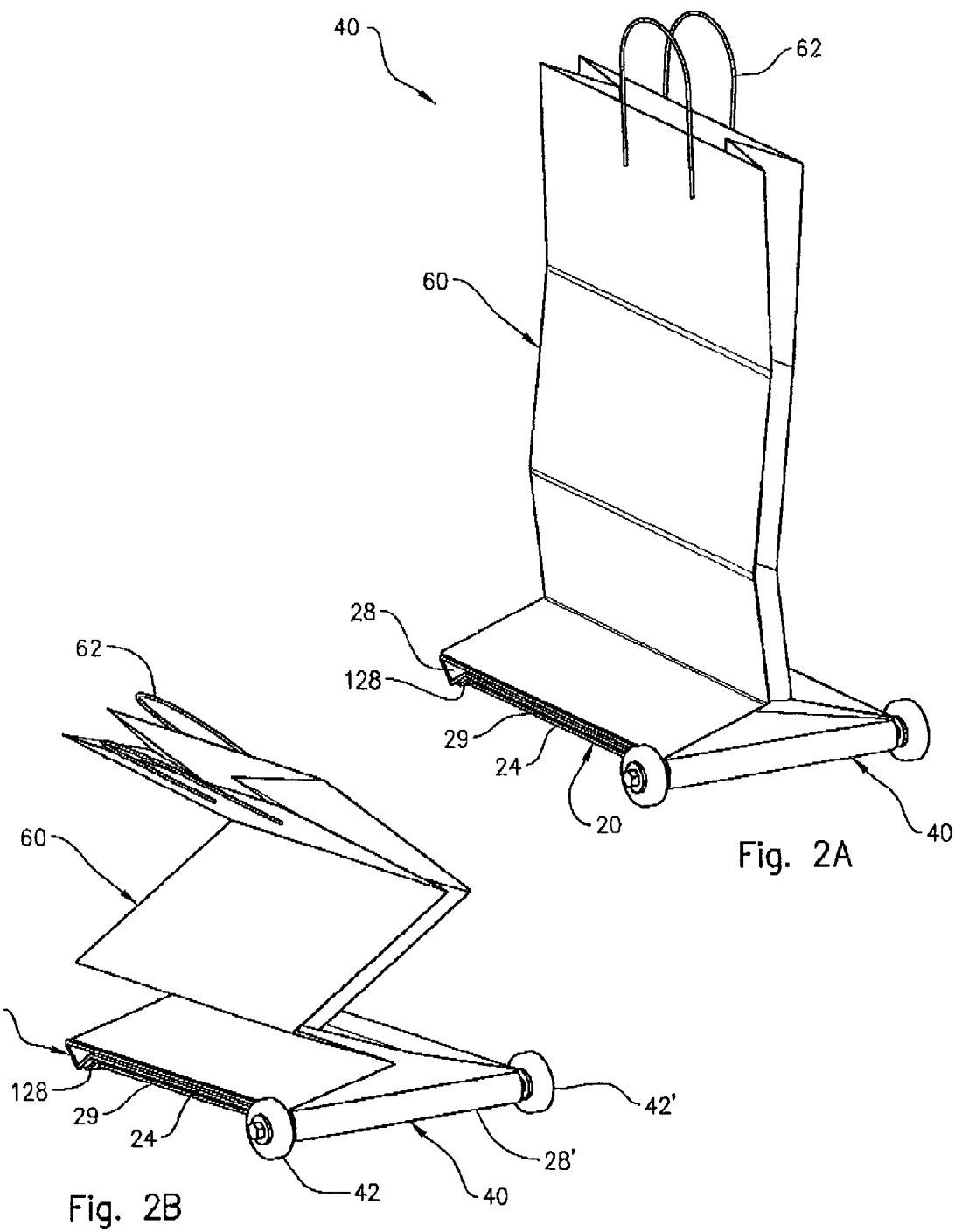

WHEELED SHOPPING BAG

BACKGROUND OF THE INVENTION

1. Field of the Invention

The present invention relates to a wheeled shopping bag, and more particularly, to a collapsible, lightweight, low cost disposable-wheeled shopping bag with characteristics that allow for compact stacking, easy deployment and quick opening, and strength.

2. Description of the Related Art

Several designs for wheeled shopping bags have been designed in the past. None of them, however, includes the convenience of being disposable while maintaining sufficient strength and being collapsible for compact stacking and storage as well as easily deployed by the user.

Applicant believes that the closest related reference corresponds to U.S. Pat. No. 3,197,225 issued to Powell for a Collapsible Shopping Bag [hereinafter "Powell Bag"]. However, it differs from the present invention because, it relies on the use of hinges and supports made of sheet metal, fabric, or a combination thereof with the intent of being reused and does not rest on its roller system assembly when at rest due to the obtuse angle of attachment of the wheels. The present invention, on the other hand, is made of a disposable, lightweight material that sits on its roller system when at rest. Furthermore, the Powell Bag is height adjustable to accommodate shoppers of various heights and does not claim or demonstrate any stacking characteristics.

One of the disadvantages of the current designs is that they rely on a multiplicity of parts, such as hinges, fasteners, and reinforcing members, to achieve stability and collapsibility. These parts result in high material and manufacturing cost. As a consequence, these designs must accommodate long term personal reuse, and thus focus on collapsing to the smallest possible dimensions for personal carry. Another disadvantage is that many of theses designs will eliminate stability by reducing the number of wheels, resulting in lateral instability when not in use. Still another shortcoming of the current designs is that they are unsuitable for stacking due, among other factors, to lateral instability, protrusions of rigid supports, bulk, and lack of flat surfaces.

The present invention solves these problems by using simple corrugated cardboard parts and paper bags that can be glued and do not require hinges. Strength of that wheeled base is achieved through the use of multiple folds of the corrugated cardboard, utilizing triangular fold for rigidity. The triangular folds not only provide strength, but provide stability and a housing for the wheels. As a result of the design of the base, multiple units may be stacked stably in their collapsed states. The natural folding characteristics of paper bags achieve collapsibility.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device of sufficient strength and rigidity to carry goods normally carried by the shopper in a non-wheeled bag.

It is another object of this invention to provide a device with a wheeled or roller mechanism that allows the shopper to pull the device.

It is also an objective of the present invention to provide a device that is easily deployed and opened by a shopper.

It is still another object of the present invention to provide a device that stacks compactly so that a single device can be removed from the top of the stack without disruption to the rest.

It is also an object of the present invention that the device rest horizontally when not being pulled by the shopper.

It is yet another object of this invention to provide such a device that is inexpensive to manufacture and maintain while retaining its effectiveness.

An objective of the present invention is that the device has reuse characteristics similar to that of other paper shopping bags or cardboard boxes.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2A shows an isometric view of bag assembly 60 in a partly collapsed condition defining fold 128 of the present invention.

FIG. 2B is another isometric view of bag assembly 60 in a collapsed condition, similar to FIG. 2a.

DETAILED DESCRIPTION OF THE PREFERRED EMBODIMENT

Figure 1:
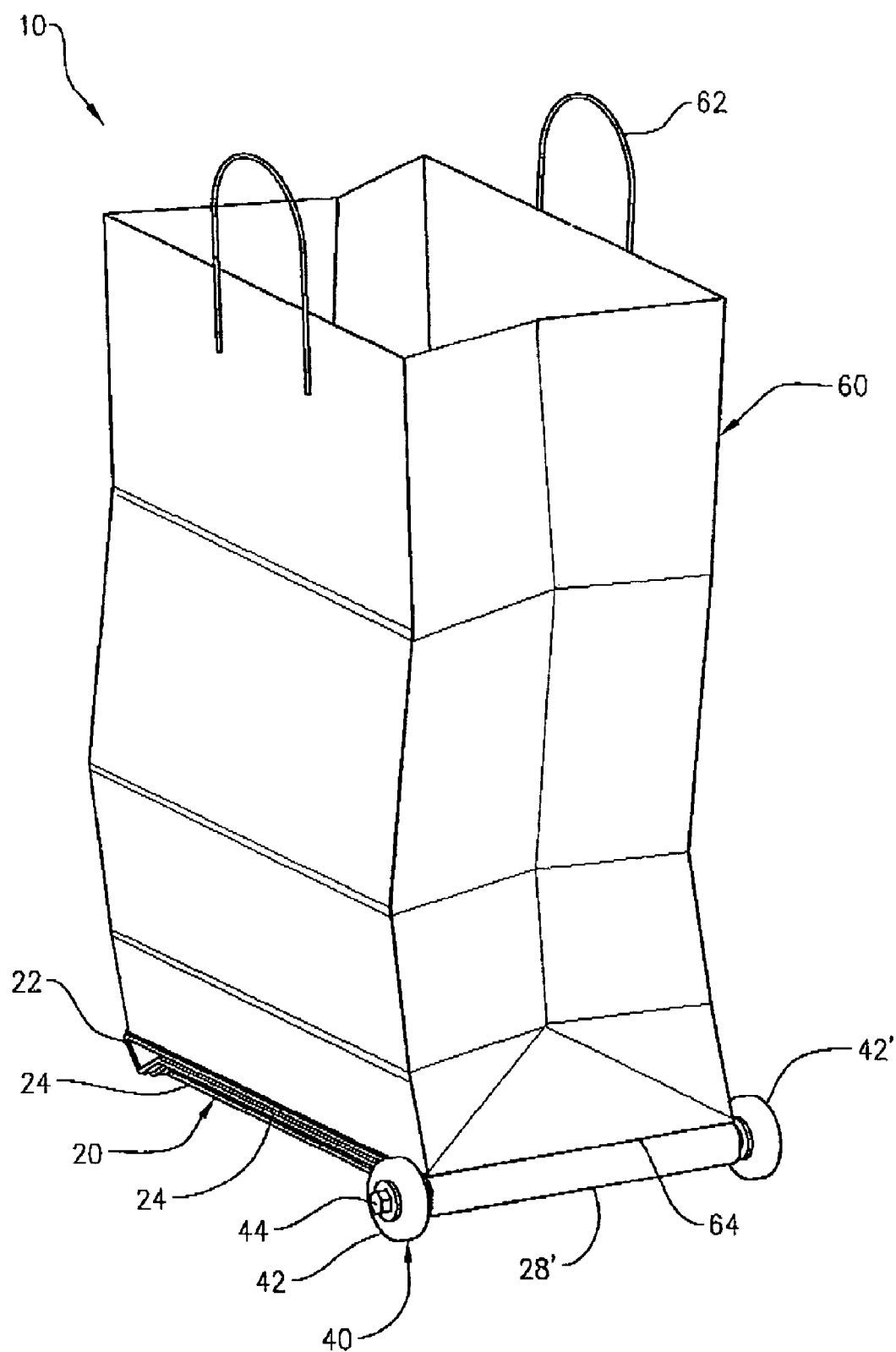
FIG. 1 represents an isometric view of one the preferred embodiments of the present invention.
Figure 1A:
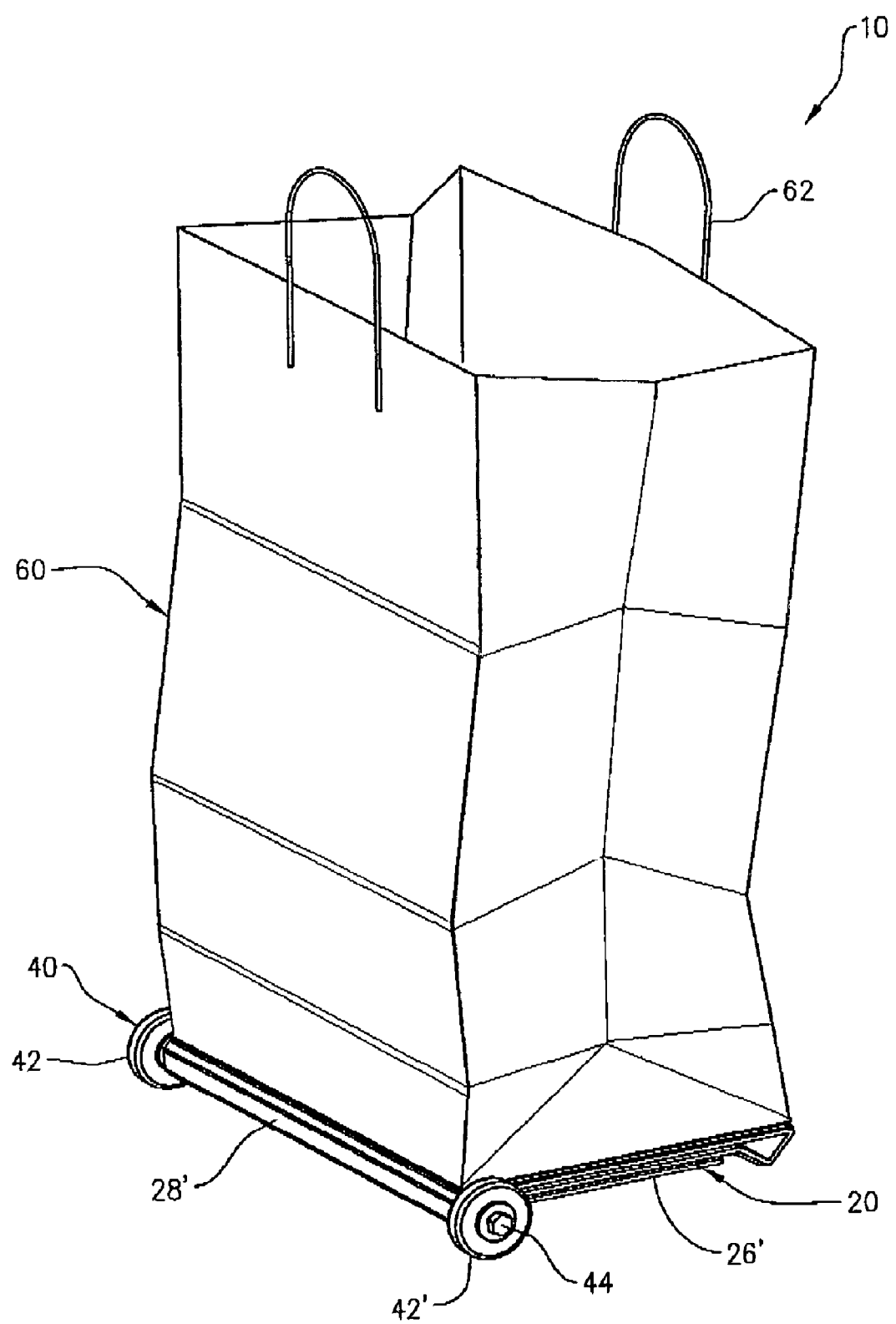
FIG. 1A is an isometric view of another of the preferred embodiments of the present invention.

Referring now to the drawings, where the present invention is generally referred to with numeral 10, it can be observed that it basically includes bottom assembly 20, wheel assembly 40 and bag assembly 60 mounted to upperside 22. A user typically tilts wheeled bag assembly 10 towards the end having the wheels and pulls from handles 62.

Bottom assembly 20 includes an upperside 22, underside 24, lateral sides 26 and 26', and ends 28 and 28'. In one of the preferred embodiments, assembly 20 is made out of moldable, yet sufficiently rigid material, such as cardboard and most preferably corrugated cardboard. While the flexibility and low cost features of this material are attractive for economic reasons, other materials with equivalent characteristics can also be used, including plastics. With corrugated cardboard, strength, low weight and low cost is obtained.

Figure 2C:
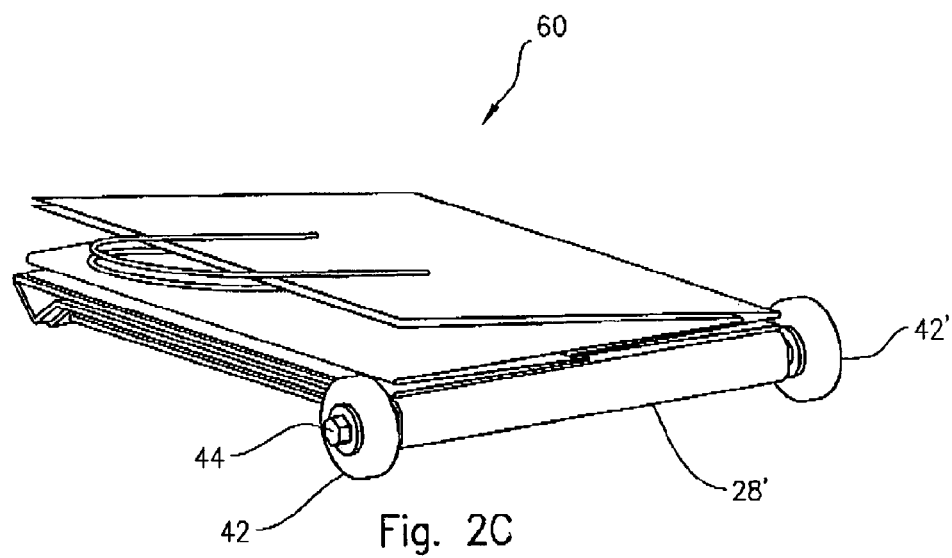
FIG. 2C shows an isometric view of bag assembly 60 in its fully collapsed state.
Figure 3:
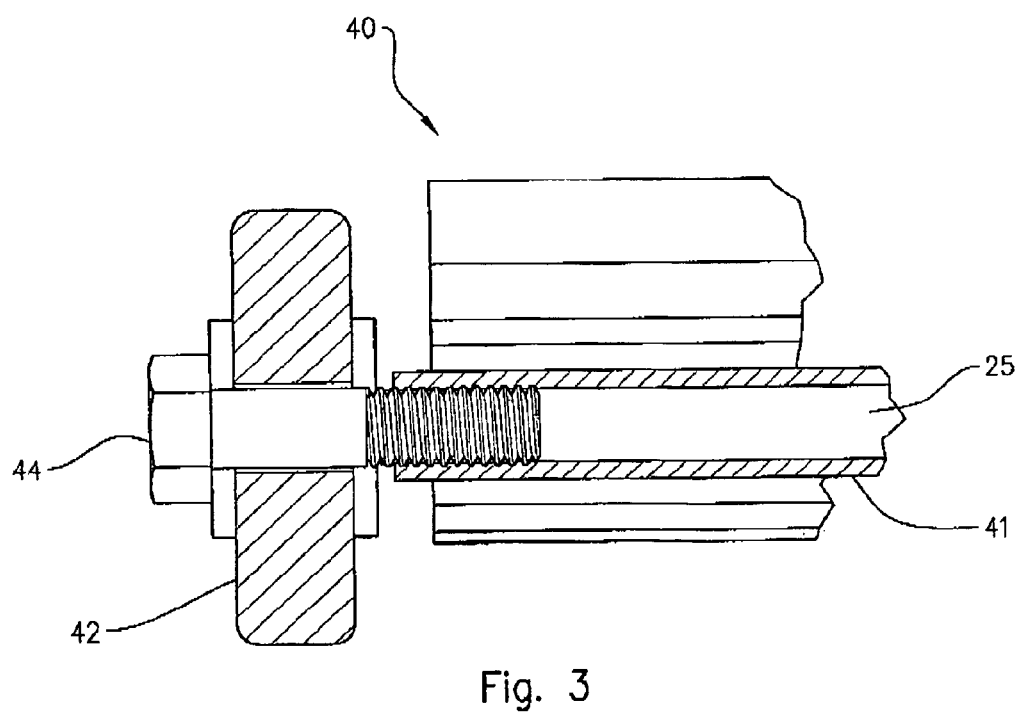
FIG. 3 shows a partial cross-sectional view of wheel assembly 40.
Figure 4:
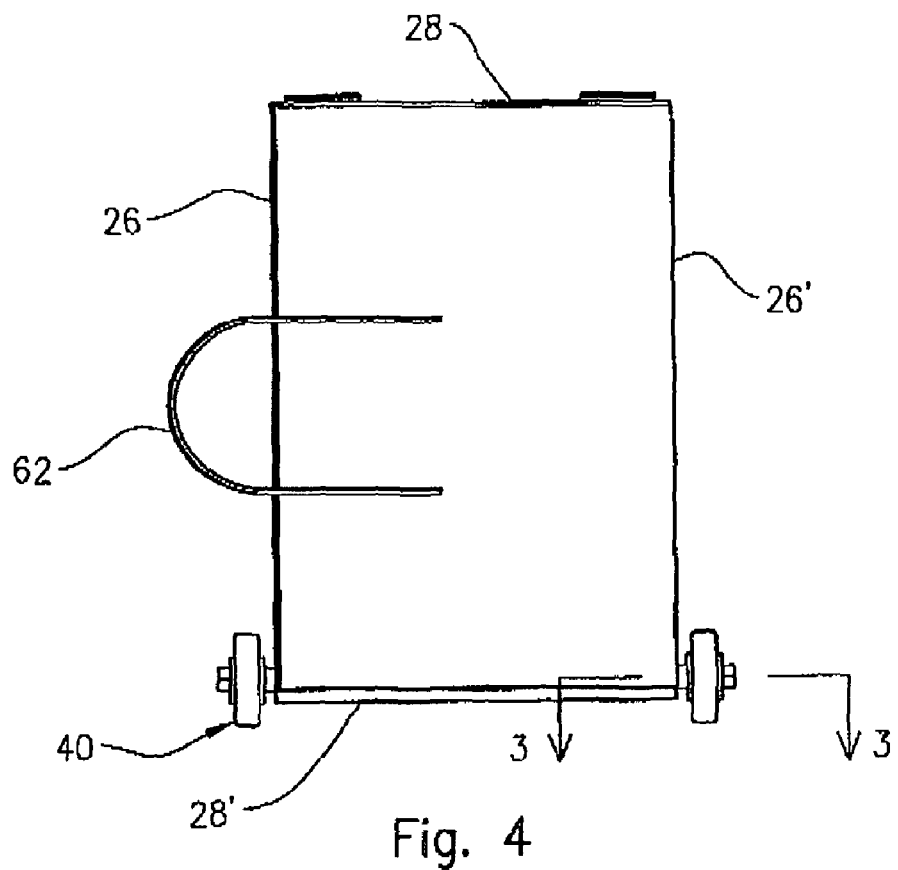
FIG. 4 illustrates a top plan view of bottom assembly 20 and wheel assembly 40.
Figure 5:
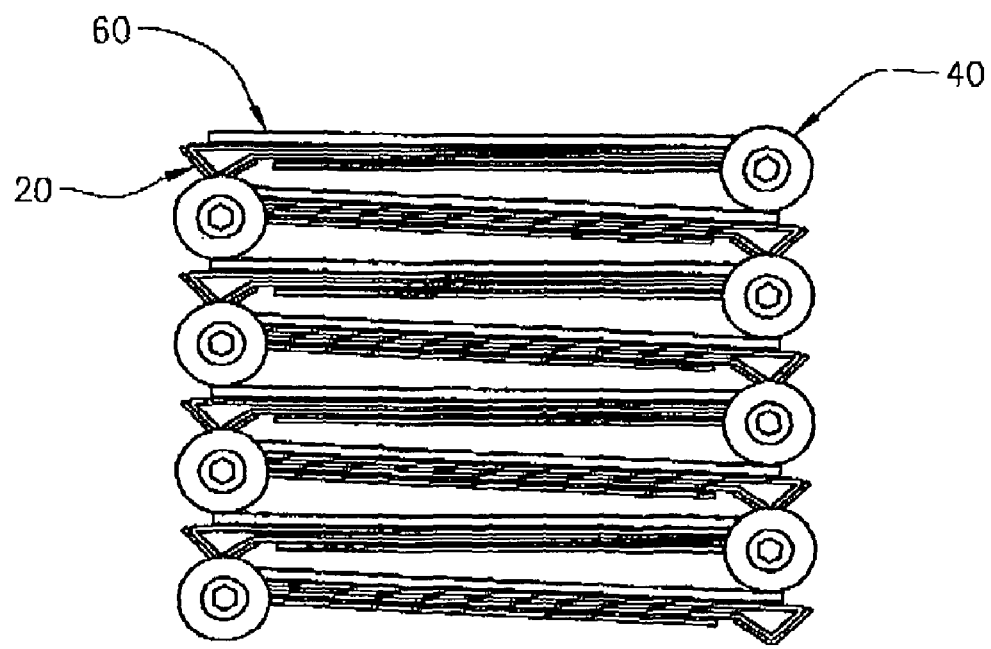
FIG. 5 illustrates the stackable characteristics of the present invention.

In one of the preferred embodiments, bottom assembly 20 has a substantially flat rectangular shape, as seen in the figures. End 28 folds inwardly defining fold 128 that, in the preferred embodiment shown in FIG. 2a, defines a shape with a triangular transversal projection. The distal inwardly extending edge 29 of assembly 20 is mounted against underside 24. It is kept in place using glue, in this preferred embodiment, but other equivalent fastening means, such as staples, can be used. The object being to provide a relatively sturdy protrusion that extends downwardly from underside 24 and with cooperative dimensions to keep bottom assembly 20 in a substantially parallel and spaced apart relationship with respect to the supporting surface on which wheeled bag assembly 20 rests.

Figure 1B:
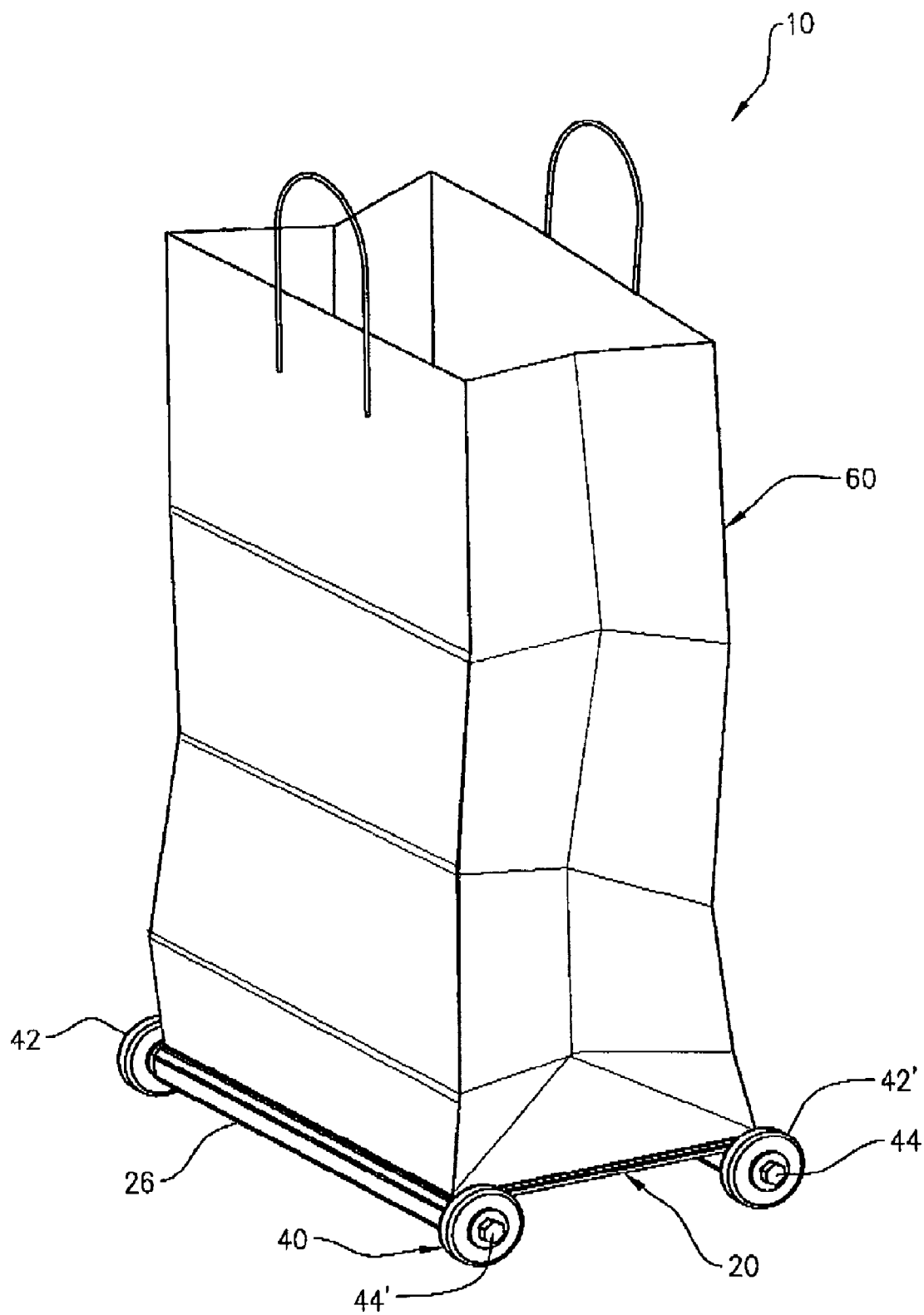
FIG. 1B shows an isometric view of yet another of the preferred embodiments of the present invention.

End 28', opposite to end 28, is defined with an inwardly fold that in the preferred embodiment has a spiral transversal projection with transversal through transverse opening 25, as best seen in FIG. 1B. Distal inwardly extending edge 29' is kept in the rolled position with glue applied to abutting layers of the corrugated cardboard and, additionally, other areas will be glued to keep fold 128' against underside 24.

Wheel assembly 40, in the preferred embodiment, includes wheel members 42 and 42' mounted to adjacent to end 28', on lateral sides 26 and 26'. Wheel members 42 and 42' are rotatably mounted to shafts 44 and 44', respectively. Shafts 44 and 44' are receivable within transversal through transverse opening 25 of fold 128', and mounted thereon. In another preferred embodiment, a tubular member 41 is inserted in transverse opening 25 to receive shafts 44 and 44'. Shafts 44 and 44' can be implemented with a thread of a cooperative diameter to bite into the inner wall of tubular member 41 thus resulting in a firm engagement.

Figure 1C:
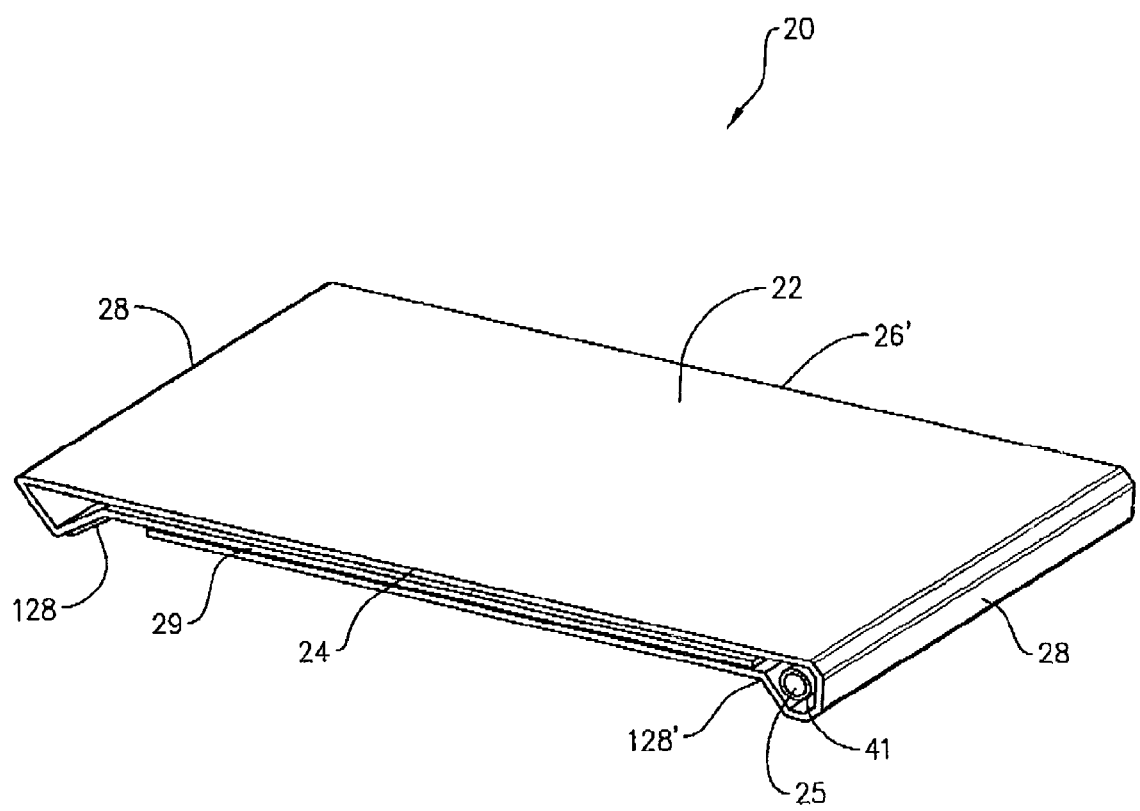
FIG. 1C shows an isometric view of bottom assembly 20 without wheel assembly 40 or bag assembly 60.

Bag assembly 60 has a bottom wall 64 that is mounted to upperside 22 directly. Or, in another preferred embodiment, a reinforcement member 70 is mounted over upperside 22. Reinforcement member 70 can be an elongated rigid member or, as shown in FIG. 1C, a sheet of a rigid material. One of the preferred reinforcement members is to mount a sheet of corrugated cardboard over upperside 22.

Bag assembly 60 is thus mounted over upperside 22 directly or on reinforcement member 70, which is in turn rigidly mounted to upperside 22. Bag assembly 60 extends upright defining a compartment and has an opening at its distal end.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wheeled bag assembly, comprising:
    A) an elongated wheeled bottom assembly made out of a rigid and moldable material having an upperside, an underside, first and second lateral sides and further including first and second ends defined, respectively, by first and second folds along said underside, said first fold extending away from said underside a first predetermined distance;
    B) wheels means including first and second wheel members, with a predetermined radius and each including first and second shafts, respectively, mounted to said first and second lateral sides, respectively, and substantially coaxially with said second transversal fold, said first and second wheel members having each a rotation axis in transversal alignment with each other and said axes extending parallel, at a second predetermined distance, from said underside; and
    C) a bag member having a substantially flat bottom wall mounted over said upperside, said bag assembly extending away from said upperside defining an internal compartment and an upper end opening at a predetermined distance away from said bottom wall, and further including handle means mounted adjacent to said upper end opening thereby permitting a user to tilt and move said bag assembly riding over said wheel members.

2. The bag assembly set forth in claim 1 wherein said bag member is collapsible.

3. The bag assembly set forth in claim 2 wherein said first predetermined distance is equal to approximately said radius plus said second predetermined distance so that, at rest, said bottom assembly is positioned at a substantially parallel and spaced apart relationship with respect to a supporting surface.

4. The bag assembly set forth in claim 3 wherein said second fold extends transversally defining a transversal through opening for receiving said first and second shafts.

5. The bag assembly set forth in claim 4 wherein said bag member is folded, when collapsed, to fit within said bottom assembly.

6. The bag assembly set forth in claim 5 wherein said bottom assembly, including said first and second folds, is made out of cardboard.

7. The bag assembly set forth in claim 6 wherein cardboard is corrugated.

8. The bag assembly set forth in claim 7 wherein said first fold has a substantially triangular transversal projection and a distal edge portion that is glued to said underside at a predetermined distance from said first end.

9. The bag assembly set forth in claim 8 wherein wheel means includes first and second tubular members with a cooperative inner diameter that tightly receives said first and second shafts, said first and second tubular members being mounted within said transversal through opening.

10. The bag assembly set forth in claim 1 further including reinforcement means mounted over said upperside.

11. The bag assembly set forth in claim 10 wherein said reinforcement means includes a substantially flat and rigid sheet having cooperative dimensions that do not extend beyond the top projection of said bottom assembly.

12. The bag assembly set forth in claim 11 wherein said bag member is collapsible.

13. The bag assembly set forth in claim 12 wherein said first predetermined distance is equal to approximately said radius plus said second predetermined distance so that, at rest, said bottom assembly is positioned at a substantially parallel and spaced apart relationship with respect to a supporting surface.

14. The bag assembly set forth in claim 13 wherein said second fold extends transversally defining a transversal through opening for receiving said first and second shafts.

15. The bag assembly set forth in claim 14 wherein said bag member is folded, when collapsed, to fit within said bottom assembly.

16. The bag assembly set forth in claim 15 wherein said bottom assembly, including said first and second folds, is made out of cardboard.

17. The bag assembly set forth in claim 16 wherein cardboard is corrugated.

18. The bag assembly set forth in claim 17 wherein said first fold has a substantially triangular transversal projection and a distal edge portion that is glued to said underside at a predetermined distance from said first end.

19. The bag assembly set forth in claim 18 wherein wheel means includes first and second tubular members with a cooperative inner diameter that tightly receives said first and second shafts, said first and second tubular members being mounted within said transversal through opening.

* * * * *